Figures 1, 2:
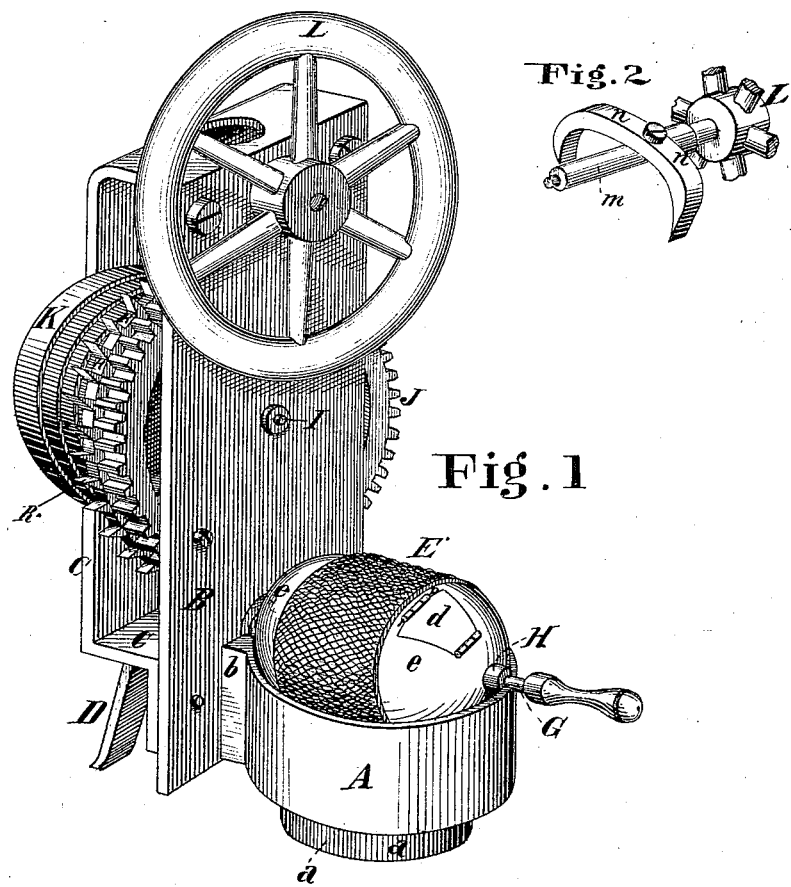

A. B. JONES.
Coffee-Roasters.

No. 148,832. Patented March 24, 1874.

Attest
J. F. Baldwin
John O'Gara

Inventor
Alonzo B. Jones
by Wood & Boyd
Attorneys

UNITED STATES PATENT OFFICE.

ALONZO B. JONES, OF MITCHELL, INDIANA, ASSIGNOR OF ONE-HALF HIS RIGHT TO CLIFTON W. HAMILTON, OF SAME PLACE.

IMPROVEMENT IN COFFEE-ROASTERS.

Specification forming part of Letters Patent No. 148,832, dated March 24, 1874; application filed April 28, 1873.

*To all whom it may concern:*

Be it known that I, ALONZO B. JONES, of Mitchell, in the county of Lawrence and State of Indiana, have invented certain new and useful Improvements in Coffee-Roasters, of which the following is a specification:

This invention relates to certain improvements in that class of coffee-roasters in which a clock mechanism imparts a revolving motion to a vessel containing the article to be roasted; the object being to simplify and render more effective such devices. The invention consists of a vessel or pot having a depending annular flange, for insertion into the pot-hole of a stove, for a purpose hereinafter described, and carrying a hollow vessel for containing the article to be roasted, which is revolved by a clock mechanism, as will be explained more fully hereinafter.

In the drawings, Figure 1 represents a perspective view of my invention; Fig. 2, a detached view of the balance-wheel, its shaft, and dog, for imparting an intermittent motion to the roasting-vessel.

The letter A represents a vessel or pot, which is of any desired shape, and is provided with an annular depending flange, a, which is for the purpose of insertion into the pot-hole of a stove, to prevent the escape of smoke, &c., from the fire-chamber through said pot-hole. The vessel A is provided with a shoulder, b, by which it is rigidly secured to a vertical frame, composed of side walls B C, the latter having at its lower end a foot, D, for supporting the frame while in use; and within the said frame is arranged a shaft, I, upon which is mounted a gear-wheel, J, firmly attached to a gear-wheel, R; and upon said shaft is also arranged a coiled spring, K, for operating the device. This spring is similar to an ordinary clock-spring, being provided with a ratchet-wheel and a pawl, to allow it to be wound up. L is a balance-wheel, mounted upon a shaft, m, journaled in the frame B C; and upon said shaft is arranged a dog, n, which engages with the ratchet-wheel R, for a purpose hereinafter explained. Within the vessel or pot A is arranged a hollow vessel, E, composed of metallic heads or disks e e and a central wire-gauze portion. The disks e serve to attach journals H to, for the rigid attachment of the shaft G; and the head e is provided with a door, d, for the insertion of the article to be roasted. Upon the inner end of the shaft G is arranged a gear-wheel, (which is not shown in the drawing,) but it is arranged to mesh into the gear-wheel J; and, by means of the clock-gearing described, a revolving motion is imparted to the roasting-vessel; and, through the medium of the dog n, a shaking or jerking motion is imparted to said vessel, for the purpose of keeping the coffee or other article in constant motion, turning it over and over continuously, and preventing its lodging in any place, by which means the coffee is much more effectually roasted.

By arranging beneath the vessel A an annular flange, a, the said vessel is adapted to a pot-hole of a stove, and is held from all lateral displacement, and it will be held firmly in position.

I am aware that a clock-gearing has been arranged in a frame, which is adapted to be supported on a stove, for propelling a coffee-roaster; but I am not aware that a vessel having a depending flange, for insertion into a pot-hole, has ever been connected directly with a frame containing clock-gearing, for imparting a revolving motion to a roaster arranged in said vessel.

I claim as my invention—

The vessel A, having the annular depending flange a for insertion in the pot-hole of a stove, for the purpose specified, said vessel containing the revolving roaster E, operated by clock mechanism, all being constructed and combined to operate in the manner and for the purpose specified.

In testimony whereof I have hereunto set my hand this 19th day of April, 1873.

ALONZO B. JONES.

Witnesses:
 JOHN O'GARA,
 EDWARD BOYD.